United States Patent [19]

Kanamaru

[11] 4,422,103

[45] Dec. 20, 1983

[54] DEVICE FOR REDUCING THE EFFECT OF TIME BASE VARIATIONS IN VIDEO DISC PLAYER

[75] Inventor: Hitoshi Kanamaru, Saitama, Japan

[73] Assignee: Universal Pioneer Corporation, Tokorozawa, Japan

[21] Appl. No.: 265,929

[22] Filed: May 21, 1981

[30] Foreign Application Priority Data

May 28, 1980 [JP] Japan .............................. 55-71172

[51] Int. Cl.³ ........................ H04N 9/44; H04N 1/28; H04N 5/78
[52] U.S. Cl. .................................. 358/320; 358/326; 358/19; 360/36.1; 360/36.2
[58] Field of Search ..................... 358/8, 19, 320, 322, 358/324; 360/36, 36.1, 36.2

[56] References Cited

U.S. PATENT DOCUMENTS 3,507,983 4/1970 Leman .................................... 358/19
4,015,288 3/1977 Ebihara et al. ....................... 358/19
4,339,770 7/1982 Dennison et al. ..................... 358/8

*Primary Examiner*—Aristotelis M. Psitos
*Attorney, Agent, or Firm*—Sughrue, Mion, Zinn, Macpeak & Seas

[57] ABSTRACT

A device for eliminating time base variations in a video disc player in which a gate pulse controlled by the latest time base information is generated for preventing faulty operation during the absence of burst signals. The gate pulse is generated after a predetermined time which is proportional to a delay control signal and which starts from a leading edge of each of the horizontal synchronizing signals. A time base information pulse is generated having a width extending from the leading edge of the gate pulse to the leading edge of the specific color burst signal appearing after the leading edge of the gate pulse when color burst signals are present and having the same width as the gate pulse when the color burst signals are absent. The delay control signal and the timing pulse are generated in turn in response to a sampling pulse and the time base information pulse when the color burst signals are present and in response only to the time base information pulse when the color burst signals are absent. The sampling pulse is produced in response to the timing pulse when the color burst signals are absent and an error signal is generated in response to a reference horizontal synchronizing pulse and the sampling pulse. A servo device operates in response to the error signal to compensate for time base variations.

7 Claims, 23 Drawing Figures

PRIOR ART FIG. 1
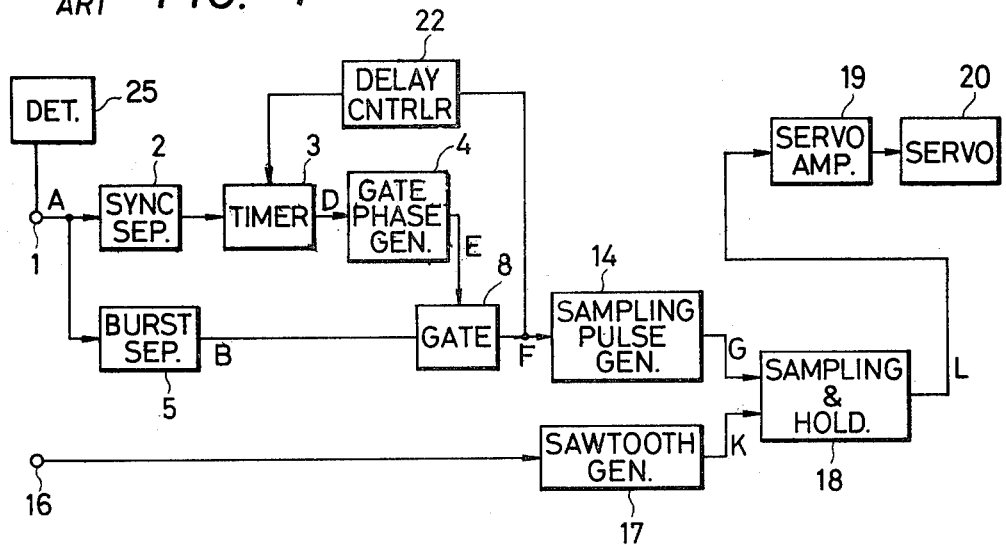
FIG. 3
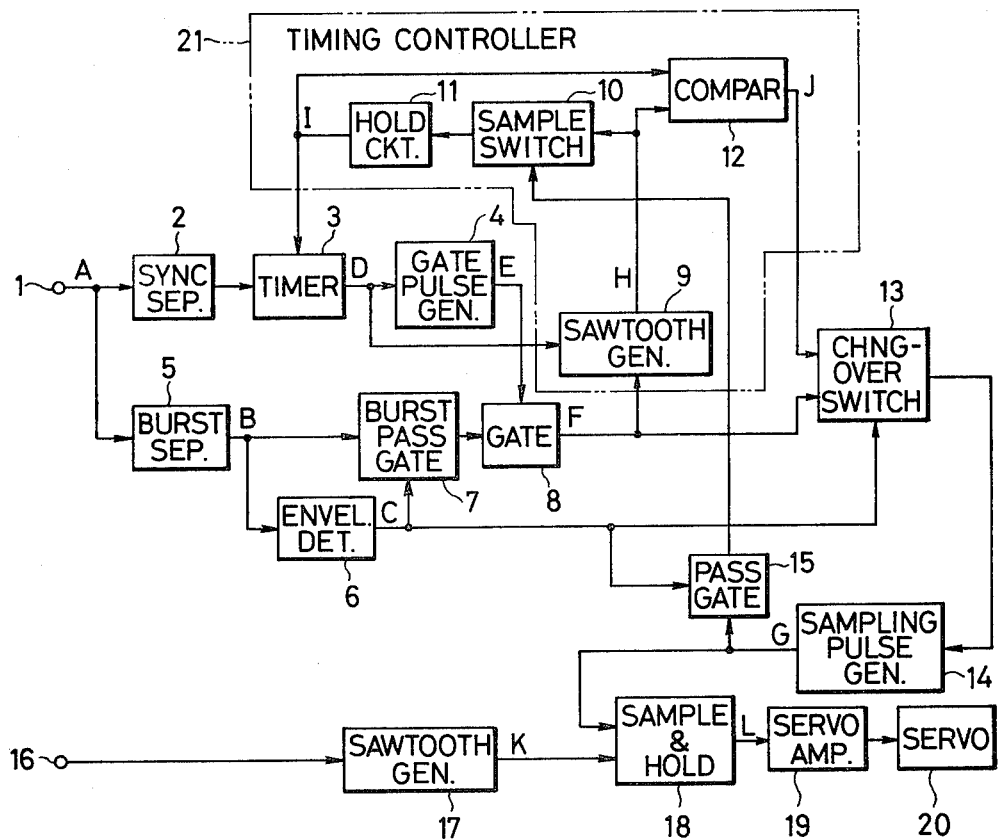

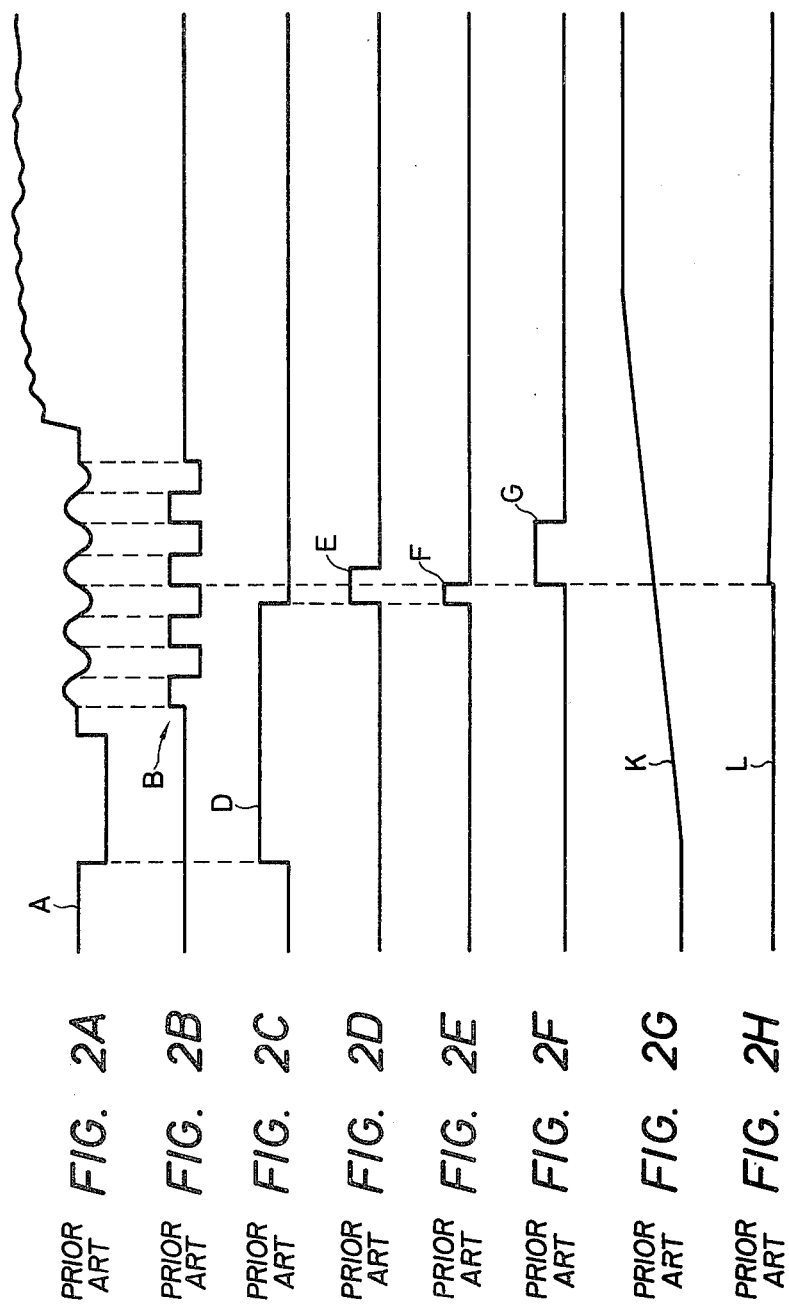

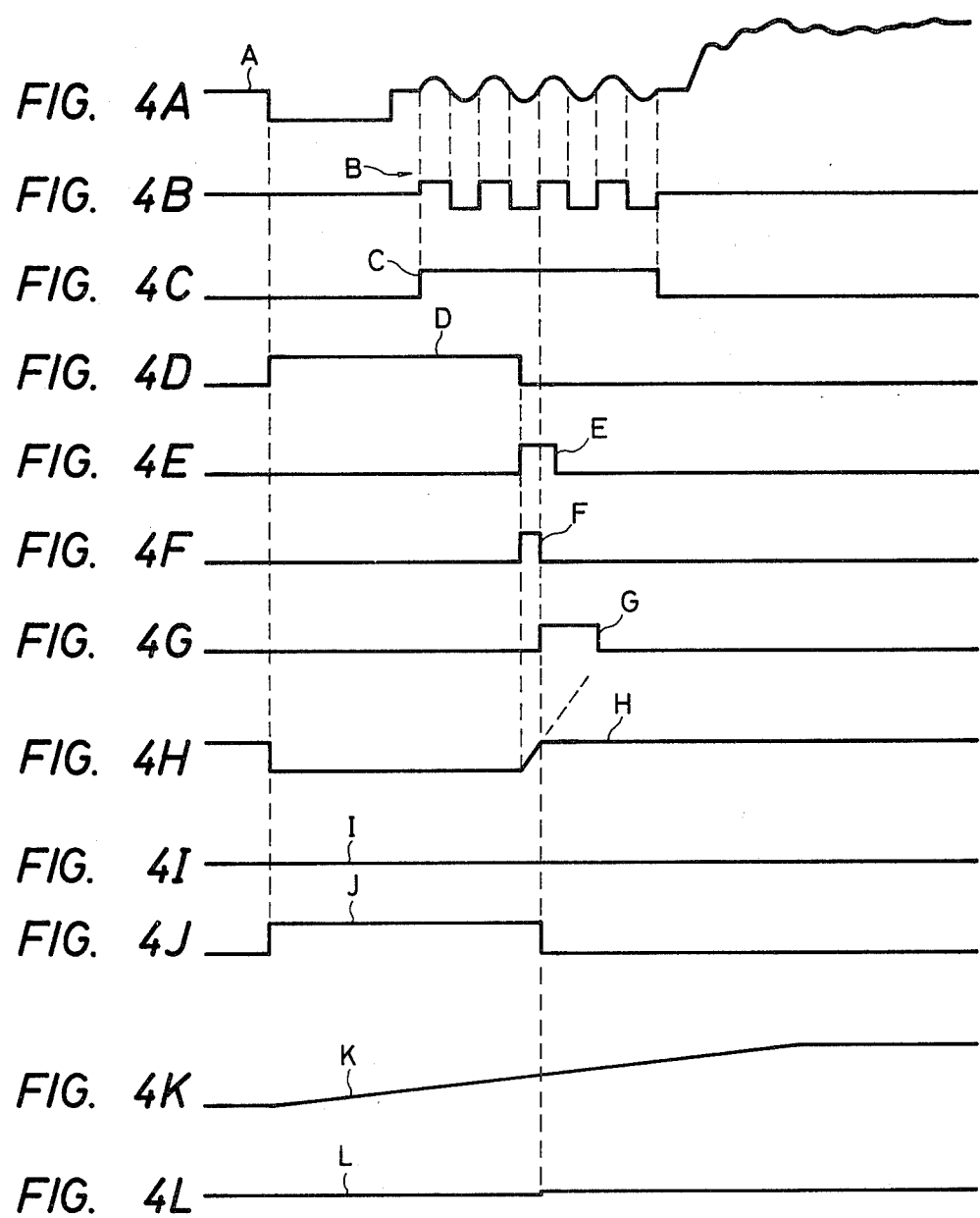

DEVICE FOR REDUCING THE EFFECT OF TIME BASE VARIATIONS IN VIDEO DISC PLAYER

BACKGROUND OF THE INVENTION

The present invention relates to a video disc player. More particularly, the invention relates to a device for eliminating time base variations in video disc players.

For reproduction of stable and normal color pictures in a video disc player, time base variations in color playedback video signals should be reduced to 10 ns or less. However, a video disc cannot be set on a turntable without some eccentricity. This inherently results in time base variations, for example, as much as 20 $\mu$s for color video signals reproduced during one revolution of the video disc.

Thus, a device for eliminating time base variations must be provided in video disc player. For this purpose, a tangential servo mechanism including a tangential mirror for deflecting a reading beam in the direction of a line tangential to the direction of disc rotation has been used in optical-type video disc players. The tangential servo mechanism uses a color burst signal which is present in color video signals as phase information in playedback signals. More specifically, a position on a time base of either the leading or trailing edge of a reproduced color burst which appears about 7 $\mu$s following the leading edge of a horizontal synchronizing signal is utilized as phase information for the color video signals.

Such a prior-art device for eliminating time base variations is shown, as an example, in FIG. 1, with waveforms of operating signals therein indicated in FIG. 2. In this conventional device, a color video signal A (FIG. 2A) is fed to a terminal 1. This signal is produced by a circuit (not shown) for detecting color video signals recorded on a video disc set on a video disc player. A synchronizing pulse separator 2 separates the horizontal synchronizing pulse signal from the color video signal A. In response to the horizontal synchronizing pulse signal, a timer 3 produces a delay pulse D (FIG. 2C) which rises at the leading edge of the horizontal synchronizing pulse signal and has a width of about 7 $\mu$s with the width being proportional to a delay control voltage. A gate pulse generator 4 generates a gate pulse E (FIG. 2D) of about 3 $\mu$s which rises at the trailing edge of the delay pulse D.

Further, a burst separator 5 separates a color burst signal from the color video signal A and generates a color burst pulse signal B (FIG. 2B). A gate 8 generates a time base information pulse F (FIG. 2E) which rises at the leading edge of the gate pulse E and falls at the leading edge of the burst pulse B which in turn rises within the duration of the gate pulse E. Thus, the width of the pulse F varies corresponding to the phase relation between the gate pulse E and the burst pulse B.

A delay controller 22 applies to the timer 3 a delay control voltage in response to a change in the width of the pulse F, and the width of the delay pulse D varies in such a manner that the leading edge of a specific burst pulse is held for the entire duration of the gate pulse E. A sampling pulse generator 14 generates the pulse G (FIG. 2F) which rises at the trailing edge of the pulse F.

A stable reference horizontal synchronizing pulse is fed to a terminal 16. This pulse is produced in the video disc player. A sawtooth signal generator 17 generates a sawtooth signal K (FIG. 2G) in synchronization with the reference horizontal synchronizing pulse. A sample-and-hold circuit 18 produces an error signal L (FIG. 2H) corresponding to any time base variation by a sample-and-hold operation on the sawtooth signal K with the sampling pulse G. The error signal L is fed to a servo mechanism 20 through a servo amplifier 19. The servo mechanism 20 controls a detection device such as a tangential mirror employed in optical-type video disc players so that the leading edge of the specific burst pulse in color video signal is held at a point in constant phase relationship to the reference horizontal synchronizing pulse whereby the color burst time base is stabilized with respect to the reference horizontal synchronizing pulse and time base variations in reproduced color video signals are eliminated.

In the above prior-art device, since no color burst signal is present during the vertical retrace time of about 9 H (about 570 $\mu$s), the width of the pulse F, which is the output of the gate 8, becomes equal to the width of the gate pulse E or may vary at random during the vertical blanking time. As a result, the delay controller 22 applies a faulty delay control voltage to the timer 3 and the width of the delay pulse D from the timer 3 becomes improper. Then, the error signal L from the sample-and-hold circuit 18 becomes faulty, and finally, undesired time base variations are produced. These are pulse-like variations having the sample frequency as the vertical synchronizing signal. This may not affect the video signals because of their occurrency during the vertical blanking time. However, periodical noise may appear as a distortion in the sound signal.

SUMMARY OF THE INVENTION

To overcome the above disadvantage, the invention provides a device for eliminating time base variations in reproduced color video signals as produced in prior-art devices as described above.

In the device of the invention, a sampling pulse which is controlled by the latest time base information is generated for prevention of any faulty operation during the absence of burst signals.

More specifically, the invention provides a device for eliminating time base variations in a video disc player comprising means for reproducing color video signals recorded on a video disc, means for separating horizontal synchronizing signals from reproduced color video signals outputted by the reproducing means, means for separating color burst signals from the reproduced color video signals and for generating color burst pulse signals in response to the color burst signals, means for detecting time intervals which have a width extending from each pulse of the horizontal synchronizing signals to a predetermined edge of the burst pulse signals to thereby produce time base information signals when the color burst signals are present, means for sampling and holding the time base information signal only when the color burst signals are present, means for generating timing edges at ends of the time intervals in response to an output of the means for sampling and holding the time base information signals, means for generating pulse signals at times determined by the predetermined edges when the color burst signals are present and to the timing edges when the color burst signals are not present, means for generating an error signal in response to a phase difference between reference horizontal synchronizing signals and the sampling pulse signals, and means for compensating for time base variations in response to the error signal.

Yet further, the invention can be practiced with a device for eliminating time base variations in a video disc player comprising means for reproducing color video signals recorded on a video disc, means for separating horizontal synchronizing signals from the color video signals thus detected, means for separating color burst signals from the color video signals and for generating a color burst pulse signal in response to the color burst signals, means for generating a gate pulse after a predetermined time from each of the horizontal synchronizing signals, means for generating a time base information pulse which has a width extending from the leading edge of the gate pulse to a predetermined edge of color burst signals appearing after the leading edge of the gate pulse when color burst signals are present and having the same width as the gate pulse when the color burst signals are absent, timing control means for generating a timing pulse in response to a sampling pulse and the time base information pulse when the color burst signals are present and in response to the timing base information pulse only when the color burst signals are not present, means for generating the sampling pulse in response to the time base information pulses when the color burst signals are present and in response to the timing pulse when the color burst signals are absent, means for generating an error signal in response to a reference horizontal synchronizing pulse and the sampling pulse, and servo means for compensating for the time base variations by controlling the means for detecting color video signals.

BRIEF DESCRIPTION OF THE DRAWINGS

FIG. 1 is a block diagram of a conventional device for eliminating time base variations;

FIGS. 2A-2H show waveforms of signals produced by individual circuits in the device of FIG. 1;

FIG. 3 is a block diagram of a device for eliminating time base variations in accordance with the invention;

FIGS. 4A-4L show waveforms of signals produced by individual circuits in the device of FIG. 3.

DESCRIPTION OF THE PREFERRED EMBODIMENTS

Figure 5:
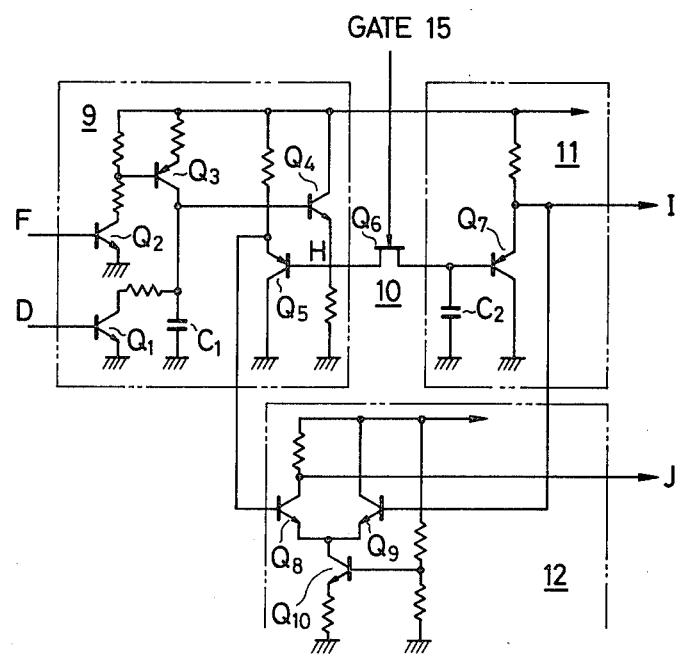
FIG. 5 is a circuit diagram of a specific example of a timing controller in the device of FIG. 3.

Referring now to FIGS. 3 and 4, a preferred embodiment of the invention will be explained, where like symbols represent like components or parts and like signal waveforms as in the device of FIGS. 1 and 2.

In the device for eliminating time base variations in accordance with the invention, a color video signal A (FIG. 4A) is fed to an input terminal 1. As before, this signal is produced by a circuit (not shown) for detecting such signals recorded on a video disc. A horizontal synchronizing signal separator 2 separates this synchronizing signal from the color video signal A. A timer 3 generates a delay pulse D (FIG. 4D), which has a width of about 7 $\mu$s proportional to a delay control voltage, which rises at the leading edge of the horizontal synchronizing signal. A gate pulse generator 4, which may be a monostable multivibrator, for example, generates a gate pulse E (FIG. 4E) of about 3 $\mu$s which rises at the trailing edge of the delay pulse D.

Further, a burst pulse signal B (FIG. 4B) which is separated from the reproduced video signal A and generated by a burst separator 5 is fed to an envelope detector 6 and to a burst pass gate 7. The envelope detector 6 produces a burst presence signal C (FIG. 4C) by envelope detection of the burst signal B. The burst pass gate 7 is turned on only when the burst presence signal C is applied thereto.

A gate 8 for generating a time base information pulse may be an RS flip-flop, for example, which produces the information pulse F (FIG. 4F) which rises at the leading edge of the gate pulse E and falls at the leading edge of a specific burst pulse which in turn rises within the duration of the gate pulse E. When the burst pulse signal B is absent, the gate 7 is turned off while the gate 8 enables the gate pulse E to pass the time base information pulse F. This pulse F is simultaneously fed to a timing controller 21 and to one input terminal of a change-over switch 13. The timing controller 21 applies to the timer 3 a delay control voltage I (FIG. 4I) in response to the pulse F and a timing pulse J (FIG. 4J) fed to the other input of the change-over switch 13. The switch 13 feeds the time base information pulse F to a sampling pulse generator 14 when the burst presence signal C is received or the timing pulse J when the signal C is not received. The sampling pulse generator 14 generates a sampling pulse G which rises at the trailing edge of the received pulse F and has a given width. The pulse G is then fed to one input terminal of a sample-and-hold circuit 18 and to a sampling pulse pass gate 15. The gate 15 can pass the sampling pulse G to the timing controller 21 only when it receives the burst presence signal C.

The sample-and-hold circuit 18 produces an error signal L (FIG. 4L) corresponding to any time base variation by a sample-and-hold operation with the sampling pulse G. This error signal L is applied to a servo mechanism 20 through a servo amplifier 19. The servo mechanism 20 operates in a similar manner, as in the device of FIG. 1, for eliminating such time base variation during the playback of color video signals.

The timing controller 21 has two functions: The first is to apply a delay control voltage to the timer 3, and the second is to provide the latest time base information to the sampling pulse generator 14 when no burst signal is present by storing a proper delay time.

The timing controller 21, which is reset with the delay pulse D, includes a sawtooth signal generator 9 for producing a sawtooth output H (FIG. 4H), the amplitude of which is proportional to the time which has elapsed from the leading edge of the time base information pulse F. The amplitude of the sawtooth output H is constant from the trailing edge of the information pulse F until the next delay pulse D rises. The sawtooth output H is passed to a hold circuit 11 through a sample switch 10 which is turned on with each sampling pulse G where it is held as the delay control voltage I in the circuit 11. The amplitude of the sawtooth output H is proportional to the width of the time base information pulse F. When a specific color burst is present, the sampling pulse generator 14 receives the time base information pulse F as in prior-art devices. However, during the vertical blanking time when no burst signal is present, the gates 7 and 15 are turned off because of the burst presence signal C which is otherwise produced by the envelope detector 6.

In this manner, the time base information pulse generator 8 produces the gate pulse E and the sawtooth generator 9 generates the sawtooth output H which rises at the leading edge of the gate pulse E. On the other hand, the sample switch 10 is turned off since the burst signal C is not applied to the sampling pulse pass gate 15 while the hold circuit 11 maintains the delay control voltage I which was held by the latest horizontal synchronizing pulse so that the timer 3 can continue to generate the delay pulse D with the same width as before the absence of the specific burst signal.

The sawtooth output H from the sawtooth generator 9 is compared with the delay control voltage I with a voltage comparator 12. The comparator 12 causes a timing pulse J to fall when the output voltage H exceeds the control voltage I. The timing pulse J is fed to the sampling pulse generator 14 through the change-over switch 13.

The delay control voltage I is proportional to the width of the time base information pulse during the normal presence of the burst signal B. This means that the voltage I corresponds to the width of the time base information pulse F just before the loss of the burst signal. Thus, the width of the latest time base information pulse can be produced again by comparison between the delay control voltage I and the sawtooth output H by the voltage comparator 12. In other words, with the sawtooth generator 9 reset with the delay pulse D, the trailing edge of the timing pulse J appears at a time following the leading edge of the horizontal synchronizing signal defined by the sum of the width of the delay pulse D and the width of the pulse F just before the absence of the burst signal. In this manner, even during the absence of the burst signal, the sampling pulse G is produced with the correct timing as if the specific color burst signal were present continuously. Therefore, the servo system is prevented from being incorrectly operated due to undesired time base variation.

The falling edge or trailing edge of the timing pulse J is delayed by the time from the leading edge of the horizontal synchronizing pulse of reproduced color video signals to the rising edge of a specific color burst. Therefore, information as to time base variations of the playback color video signal A is retained properly with an accuracy as high as that of the horizontal synchronizing pulse.

When the burst signal B appears again after the vertical blanking time, the envelope detector 6 feeds the burst presence signal C to turn the gates 7 and 15 on and the time base information pulse F is applied to the sampling pulse generator 14 via the change-over switch 13 whereby the device restarts normal operation. The delay control voltage I held by the hold circuit 11 at this time does not differ greatly in magnitude from a voltage fed again from the sample switch 10 so that there is no large time base variation.

FIG. 5 shows an example of a practical circuit for the timing controller 21. In this circuit the sawtooth generator 9 includes the transistors Q1, Q2, Q3, Q4 and Q5. The delay pulse D renders the transistor Q1 conductive. The ungrounded terminal of a capacitor C1 is short circuited for resetting the sawtooth generator 9. At the end of the delay pulse D, the transistor Q2 is rendered conductive with the time base information pulse F applied thereto to operate a constant current source including the transistor Q3 for charging the capacitor C1 with the constant current and generating the sawtooth voltage H. At the end of the time base information pulse F, the two transistors Q2 and Q3 are made nonconductive and the voltage just before the end of the pulse F is stored by the capacitor C1. The sawtooth voltage H, after passing through an emitter follower including the transistor Q4, is applied to a capacitor C2 in the hold circuit 11 while the sampling switch 10, composed of a transistor Q6 is closed with the sampling pulse G. The voltage across the capacitor C2, which is held as long as the transistor Q6 is nonconductive, is applied as a control voltage to the delay timer 3 and to the voltage comparator 12 through an emitter follower including transistor Q7.

The voltage comparator 12 includes transistors Q8, Q9 and Q10. When the sawtooth voltage H through the transistor Q15 is lower than the control voltage I, the collector voltage of the transistor Q8 is high. The base voltage of the transistor Q8 rises linearly. When it exceeds the base voltage of the transistor Q9, the collector voltage of the transistor Q8 is reduced to a low level thus forming the falling edge of the timing pulse J.

As readily understood from the foregoing description, the device for eliminating time base variations in accordance with the invention uses as information on variations in color video signals a change in phase relationship between the falling edge or the leading edge of a horizontal synchronizing pulse and either the leading edge or the trailing edge of a specific color burst signal which appears a predetermined time following the leading edge of the pulse. The information on the position of the leading edge or the trailing edge of the specific burst signal is stored as a delay time with respect to the horizontal synchronizing signal. During the vertical blanking time without any color burst signal present, a timing pulse is generated after the leading edge of the horizontal synchronizing pulse with the delay thus stored. This is used to represent the edge of the specific burst signal. Time base variations are thereby eliminated, which could otherwise caused by noise and discontinuity in operation during the absence of the color burst. Thus, the device for eliminating time base variations of the invention is quite effective for eliminating synchronous noise which is produced in sound signals by instable operation of a tangential mirror during the absence of any color burst in an optical-type video disc player.

It will also be apparent that the invention is applicable not only to optical-type video disc players but to any other type, such as an electrostatic type.

The servo mechanism in the device for eliminating time base variations in accordance with the invention is not described in a specific or limited sense and may be replaced by an all-electronic servo mechanism such as by using charge coupled devices (CCD).

What is claimed is:

1. A device for eliminating time base variations in a video disc player comprising:
   means for reproducing color video signals recorded on a video disc;
   means for separating horizontal synchronizing signals from reproduced color video signals;
   means for separating color burst signals from said reproduced color video signals and means for generating color burst pulse signals in response to said color burst signals;
   means for producing color burst presence signals indicative of periods when said color burst pulse signals are present;
   means for generating, in response to said horizontal synchronizing signals, a delay pulse signal having a duration determined in accordance with a delay control signal;
   means responsive to said delay pulse signal and said color burst pulse signals for generating, when said color burst pulse signals are present, time base information signals having a pulse width extending from a trailing edge of each pulse of said delay pulse signal to a predetermined edge of said color burst pulse signals;

means for generating a ramp signal, said ramp signal generating means being synchronized by said time base information signals, whereby said ramp signal is started at leading edges of pulses of said time base information signals and reset at trailing edges of said time base information signals;

means responsive to said color burst presence signals for sampling and holding said ramp signal in response to said time base information signals only when said color burst presence signals are present;

means for comparing a level of said ramp signal with an output of said sampling and holding means;

means responsive to said color burst presence signals for generating sampling pulse signals at times determined by said predetermined edges when said color burst presence signals are present and to an output of said comparing means when said color burst presence signals are not present;

means for generating reference horizontal synchronizing signals;

means for generating an error signal in response to a phase difference between said reference horizontal synchronizing signals and said sampling pulse signals; and means for compensating for said time base variations in response to said error signal.

2. A device for eliminating time base variations in a video disc player comprising:

means for reproducing color video signals recorded on a video disc;

means for separating horizontal synchronizing signals from reproduced color video signals;

means for separating color burst signals from said color video signals and means for generating a color burst pulse signal in response to said color burst signals;

means for generating color burst presence signals indicative of periods when said color burst signals are present;

means for generating a gate pulse after a predetermined time from each of said horizontal synchronizing signals;

means responsive to said gate pulse, said color burst presence signal and said color burst pulse signal for generating a time base information pulse which has a width extending from the leading edge of said gate pulse to a predetermined edge of said color burst signals appearing after the leading edge of said gate pulse when said color burst presence signals are present and which has the same width as said gate pulse when said color burst presence signals are absent;

timing control means for generating a timing pulse in response to a sampling pulse and said time base information pulse when said color burst presence signals are present and in response to said sampling pulse alone when said color burst presence signals are absent;

means responsive to said color burst presence signals for generating said sampling pulse in response to said time base information pulse when said color burst presence signals are present and in response to said timing pulse when said color burst presence signals are absent;

means for generating a reference horizontal synchronizing pulse;

means for generating an error signal in response to said reference horizontal synchronizing pulse and said sampling pulse; and servo means for compensating for time base variations in response to said error signal.

3. The device for eliminating time base variations as claimed in claim 2, wherein said means for generating a time base information pulse comprises a first gate for passing said color burst pulse signals with said color burst presence signal; and a second gate for receiving said gate pulse and said color burst pulse signals through said first gate.

4. The device for eliminating time base variations as claimed in claim 2, wherein said timing control means comprises a generator for generating a sawtooth signal in synchronization with said time base information pulse; a sample switch for sampling said sawtooth signal with said sampling presence only when said color burst pulse signals are present; a hold circuit for holding a sample output voltage from said sample switch and producing said delay control signal; and a comparator for producing said timing pulse when said sawtooth signal exceeds the output voltage from said hold circuit.

5. The device for eliminating time base variations as claimed in claim 3, wherein said means for generating a sampling pulse comprises a change-over switch for passing said time base information pulse when said color burst presence signal is present and passing said timing pulse when said color burst presence signal is not present, and a generator for generating said sampling pulse in response to the output of said change-over switch.

6. The device for eliminating time base variations as claimed in claim 4, wherein said generator for generating a sawtooth signal comprises NPN first and second transistors having emitters thereof grounded, said delay control signal being coupled to a base of said first transistor and said time base information pulse being coupled to a base of said second transistor; a PNP third transistor having a base coupled through a first resistor to a collector of said second transistor through a second resistor to a power source, a collector coupled to a collector of said first transistor through a third resistor, and an emitter coupled through a fourth resistor to said power source; a first capacitor coupled between said collector of said third transistor and ground; an NPN fourth transistor having a base coupled to said collector of said third transistor, a collector coupled to said power source and an emitter coupled through a fifth resistor to round; and a PNP fifth transistor having a collector coupled to ground, a base coupled to said emitter of said fourth transistor and an emitter coupled through a sixth resistor to said power source;

wherein said sample switch comprises an FET sixth transistor having one of a source and drain electrode coupled to said emitter of said fourth transistor and a gate electrode coupled to said sampling pulse;

wherein said hold circuit comprises a PNP seventh transistor having a base coupled to the other of said source and drain electrode of said sixth transistor, a collector coupled to ground and an emitter coupled through a seventh resistor to said power source; and a second capacitor coupled between said base of said seventh transistor and ground; and wherein said comparator comprises an NPN eighth transistor having a base coupled to said emitter of said fifth transistor and a collector coupled through an eighth resistor to said power source; an NPN ninth transistor having a collector coupled to said power source, an emitter coupled to an emitter of said eighth transistor and a base coupled to said emitter of said seventh transistor; an NPN tenth transistor having a collector coupled to said emitters of said eighth and ninth transistors, an emitter coupled through a ninth resistor to ground, and a base coupled through a tenth resistor to ground and an eleventh resistor to said power source, said drain control signal being produced at said emitter of said seventh transistor and said base at ninth transistor and said timing pulse being produced at said collector of said eighth transistor.

7. A device for eliminating time base variations in a video disc player, comprising:

means for separating horizontal synchronizing signals from color signals reproduced from a video disc;

means for separating color burst signals from said reproduced color video signals and for generating color burst pulses in response to said color burst signals;

means for generating color burst pulses in response to said color burst signals;

means for producing color burst presence signals indicative of periods when said color burst signals are present;

means for producing a first control signal having an active state duration extending from a predetermined time following leading edges of said horizontal synchronizing signals to predetermined edges of said color burst pulses;

means for producing a time interval information signal having an amplitude determined by said active state duration of said first control signal;

means for repetitively sampling and holding said time interval information signal when said color burst presence signals are present and holding said time interval information signal when said color burst signals are absent;

means for generating a second control signal having a transition between signal levels at times determined in accordance with said time interval information signal and an output of said sampling and holding means;

means for outputting as a third control signal said first control signal when said color burst presence signals indicate said color burst signals are present and said second control signal when said color burst presence signals indicate said color burst signals are absent;

means for generating reference horizontal synchronizing signals;

means for producing an error signal by comparing a phase of said reference horizontal synchronizing signals with a phase of said fourth control signal; and time base compensating means operating in response to said error signal.

* * * * *